July 6, 1926.
H. V. HAIGHT
GRAVITY AIR BRAKE
Filed Jan. 9, 1926
1,591,621
3 Sheets-Sheet 3
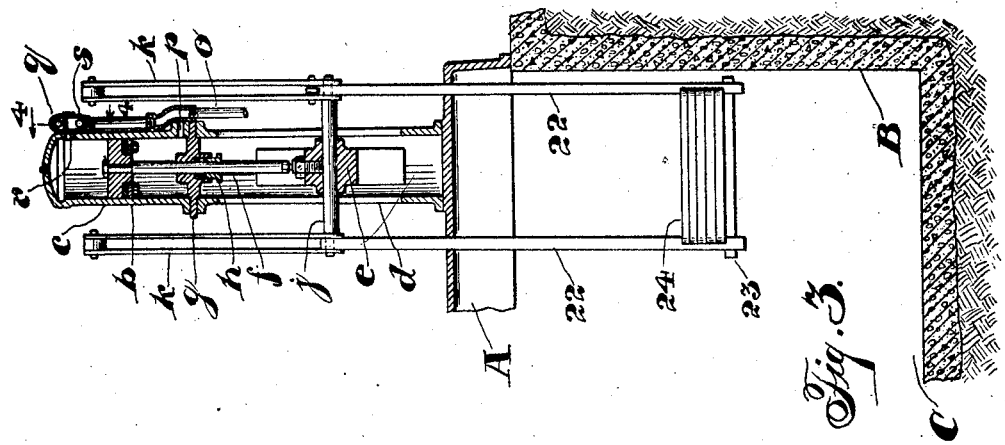
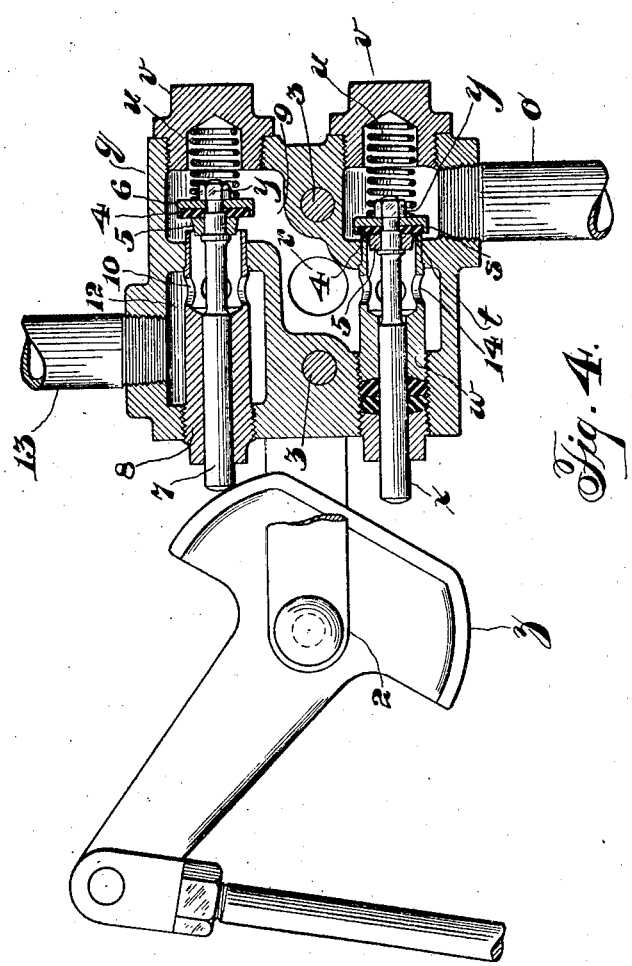
INVENTOR
Harry V. Haight
BY
Herbert K. Ogden
HIS ATTORNEY Patented July 6, 1926.

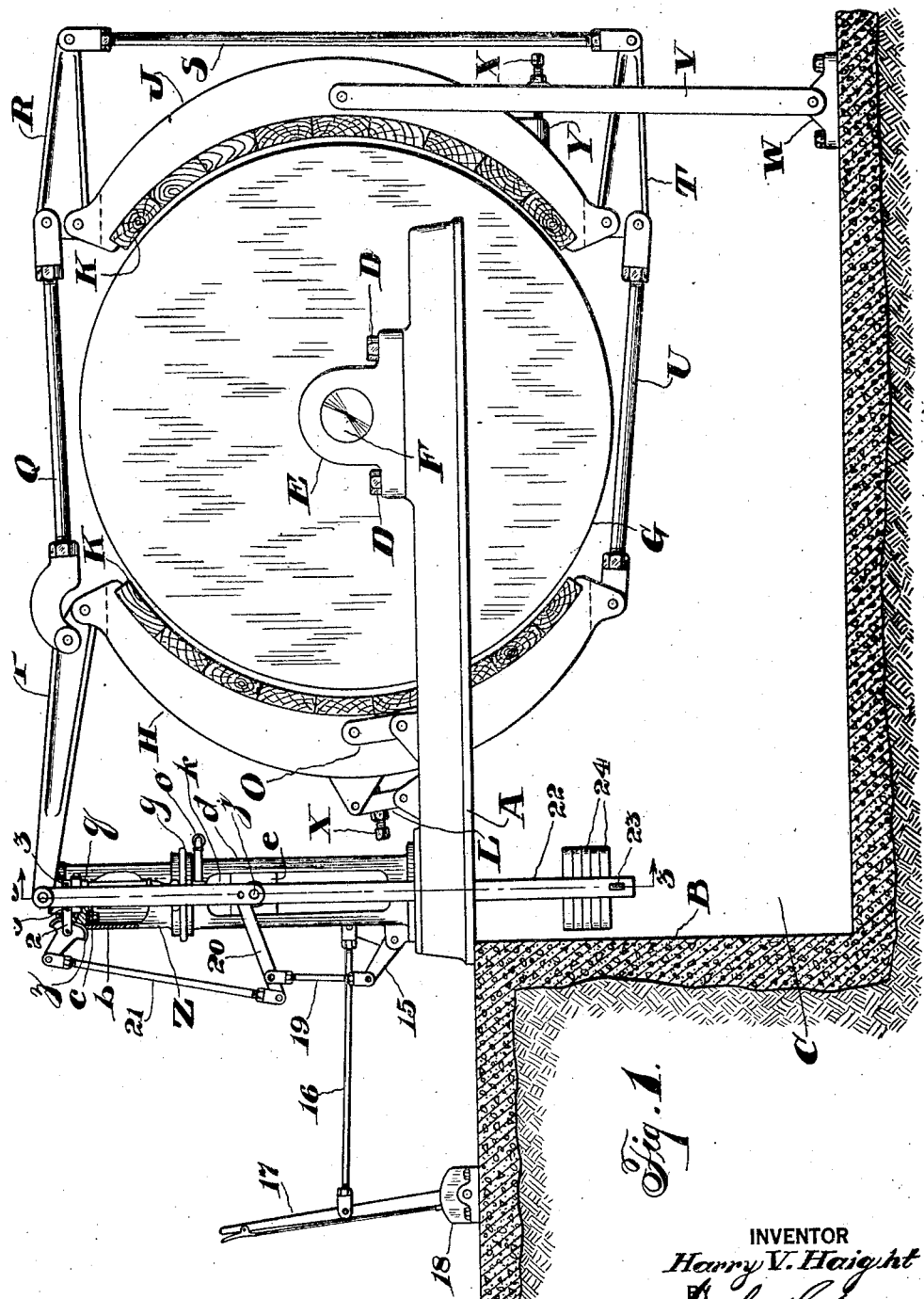

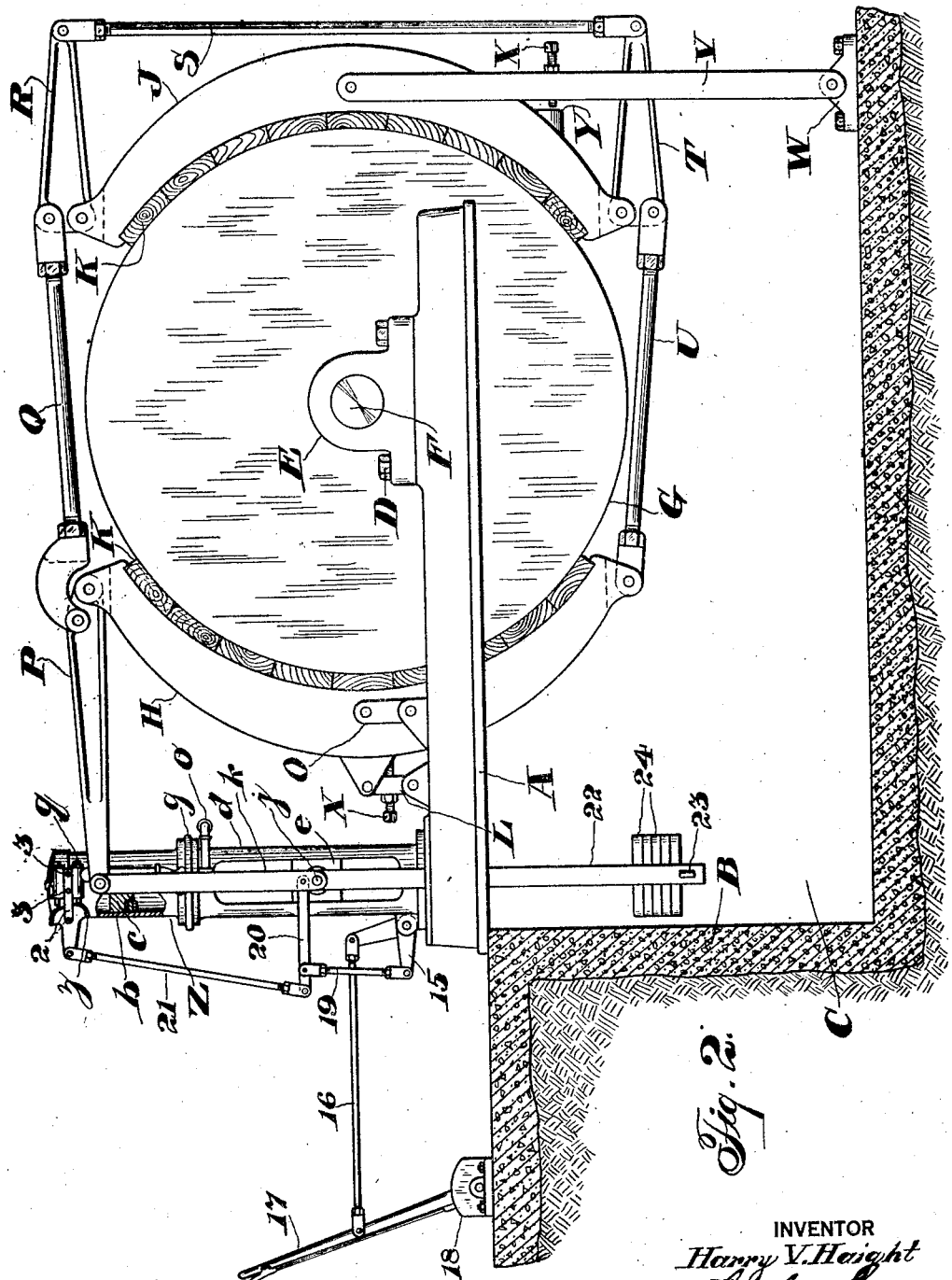

1,591,621

UNITED STATES PATENT OFFICE.

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

GRAVITY AIR BRAKE.

Application filed January 9, 1926. Serial No. 80,185.

This invention relates to hoists, but more particularly to a gravity air brake for heavy duty hoists.

The objects of the invention are to automatically apply the brake for a hoist drum in the event that the supply of pressure fluid used for actuating the brake should fail, to prevent grabbing of the brake shoes on the drum, to enable the brake operating piston to instantly regain equilibrium after being moved from one position to another in the cylinder and to construct a highly efficient and dependable air brake which will respond quickly and effectually to the will of the operator.

Further objects will be in part obvious and in part pointed out hereinafter.

The invention consists of the combinations of elements, features of construction and arrangement of parts having the general mode of operation substantially as hereinafter described and more particularly pointed out in the appended claims and illustrated in the accompanying drawings, in which Figure 1 is a side view in elevation of a hoist equipped with a gravity air brake partly broken way and illustrating the position of the parts when the brake is released, Figure 2 is a view similar to Figure 1 showing the brake applied to the drum of the hoist, Figure 3 is a transverse sectional view in elevation taken through Figure 1 on the line 3—3 looking in the direction of the arrows, and Figure 4 is an enlarged detail view partly in section taken on the line 4—4 of Figure 3 looking in the direction of the arrows, showing the valves used for controlling the brake piston and the manner in which said valves are controlled.

Referring to the drawings, A indicates a hoist base, in this instance supported by a foundation B which forms a pit C. Secured to the base A by bolts D is a bearing E in which may be arranged rotatably a shaft F for a hoist drum G. The hoist drum G may be connected to be rotated by any suitable source of power, (not shown) and a suitable braking element for said drum is in this instance provided in the form of brake shoes H and J. The brake shoes H and J are arranged on opposite sides of the drum and carry on their inner faces brake linings K, which may be in the form of wooden blocks, asbestos, or any other material suitable for this purpose. In order that the brake shoes H and J may be uniformly applied and released to and from the drum G, a pair of parallel links L and O are in this instance pivoted at one end to the base A and are pivoted at the other end to the brake shoe H. In this way the brake shoe H is permitted to be advanced to and from the drum in a horizontal direction, but pivotal movement of said brake shoe with respect to the drum is prevented.

In order that the described movement of the brake shoe H may be transmitted to the brake shoe J, a lever P is pivoted to the top of the brake shoe H, and with a rod Q pivoted thereto comprises a toggle through which movement of the brake shoe H may be transmitted to an arm R connected pivotally to both the rod Q and the upper end of the brake shoe J.

To the end that any movement of the upper portion of the brake shoes H and J may be transmitted to obtain a corresponding movement of the lower portion of said brake shoes, a rod S connects the arm R with a similar arm T at the lower portion of the brake shoe J and which arm, like the arm R, is also pivoted to the brake shoe J and to a rod or link U which connects pivotally the arm T with the lower portion of the brake shoe H. The rods Q and S and the link U are preferably formed to provide adjustment, that is, so that the brake shoes H and J may be applied more quickly or later to the brake drum G with a correspondingly smaller or greater movement of a prime mover.

Suitable means are provided for holding the brake shoe J in substantially the same horizontal plane as the brake shoe H. To this end a support in the form of a bar V is pivoted at one end to the brake shoe J and at its other end is pivoted to a bearing W secured to the floor of the pit C. In order that all points of the contacting faces of the brake linings K may be at all times equidistant from the periphery of the drum G, a stop in the form of a screw X is carried by the bar V to cooperate at its ends with a lug Y on the brake shoe J. Similarly, a screw X is carried by the link L to cooperate with the brake shoe H. In this manner the brake shoes H and J are prevented from tipping about the pivots on which they are supported.

Supported at one end of the base A is an engine Z comprising a cylinder $b$ and a reciprocatory piston $c$. A base $d$ forms a support for the cylinder $b$ and also serves as a guide for a cross head $e$ which is connected to the piston $c$ by means of a connecting rod $f$. A cylinder head $g$ interposed between the cylinder $b$ and the base $d$ forms a closure for one end of said cylinder and is provided with a packing gland $h$ arranged about the rod $f$ to prevent leakage of pressure fluid from the cylinder.

In the present instance, a rod $j$ is arranged transversely through the cross head $c$ to be carried thereby and has pivoted to its ends arms $k$ which are connected pivotally at their other ends to the lever P. In this way any movement of the piston $c$, and consequently of the cross head $e$, will be transmitted by the arm $k$ to the lever P. A constant supply of pressure fluid is preferably maintained in the lower portion of the cylinder $b$. The pressure fluid for actuating the piston in opposite directions is conveyed to the cylinder through a pipe $o$ which may lead from any suitable source of pressure fluid supply and communicates with the cylinder $b$ at its lower portion through a passage $p$. The pipe $o$ leads to a valve chest $q$ which communicates with the top portion of the cylinder $b$ through a passage $r$. The admission of pressure fluid from the pipe $o$ into the top portion of the cylinder $b$ is in this instance controlled by a valve $s$ normally held on a seat $t$ by the combined force of the pressure fluid in the pipe $o$ and a spring $u$ bearing against the valve at one end and with its other end against a plug $v$ screwed into the valve chest $q$. The valve seat $t$ is preferably formed on the end of a bushing $w$ screwed into the valve chest and which bushing also serves as a guide for a stem $x$ secured to the valve $s$ by means of a nut $y$. The stem $x$ extends exterior of the chest $q$ and is adapted to be opened by a cam $z$ mounted pivotally rearwardly of the valve chest $q$ and supported by a pair of bars or straps 2. The bars or straps 2 may, if desired, be formed integrally with the valve chest $q$, or, as shown may be secured or clamped thereto by means of bolts 3 which also serve to secure the valve chest to the cylinder.

In order to prevent marring of the seat $t$ and thus also eliminate regrinding of the seat, the inner face of the valve $s$ is provided with a soft washer 4, such as leather or rubber, which is preferably clamped between the valve $s$ and a washer 5 carried by the stem $x$. The washer 5 is preferably tapered so that when the valve approaches its seat, the amount of air flowing into the cylinder is gradually cut down and permits the piston $c$ to come to rest without causing excess velocity of said piston. The larger portion of the tapered washer 5 is substantially of the same diameter as the inner periphery of the seat $t$ so that the air will be practically shut off when the soft washer 4 reaches the seat $t$.

A valve 6, similar to the valve $s$, is arranged in the valve chest $q$ to control the exhaust of pressure fluid from the top portion of the cylinder $b$. The valve 6 is likewise provided with a tapered washer 5 for the purpose of insuring a gradually increasing exhaust from the top portion of the cylinder $b$ when the valve 6 is opened. A valve stem 7 carried by the valve 6 is guided in a partially hollow valve bushing 8, and, like the valve stem $x$, also extends exterior of the valve chest to be actuated by the cam $z$. In this instance the valves $s$ and 6 are in communication with the passage $r$ through a common chamber 9. The valve 6 being adapted to reciprocate in said chamber and pressure fluid admitted from said chamber into the bushing 8 passes therefrom through a plurality of ports 10 into a chamber 12 surrounding the bushing from whence it may escape to the atmosphere through a pipe 13. The bushing $w$ is also provided with a plurality of ports 14 to permit the passage of pressure fluid from the interior of said bushing into the chamber 9.

Suitable means are provided for manually rocking the cam $z$ about its pivot. To this end a bell crank 15 is mounted on the base $d$ and has secured pivotally to one arm thereof a rod 16 which is secured pivotally at its other end to a regulating lever 17 mounted on a bearing 18. To the other arm of the bell crank 15 is pivoted an upwardly extending rod 19 which engages pivotally a link 20 secured at one end to one of the arms $k$. The rod 19 preferably engages the link 20 intermediate its ends and a rod 21 forms a pivotal connection between the link 20 and the cam $z$. By thus pivoting one end of the link 20 to the arm $k$, said link will act to compensate for any extreme movement of the lever 17, either for applying the brake or for releasing it, as the case may be. For instance, assuming that the cam $z$ is in position for exhausting pressure fluid from above the piston as illustrated in Figure 1, and it be desired to quickly apply the brakes, the operator may then move the lever 17 to its extreme position from the engine without thought as to the exact stopping position of the lever. Such movement of the lever 17, however, will cause a considerably greater portion of the face of the cam to travel over the valve stem $x$ than is necessary to open the valve and, as a result, a much greater movement of the lever 17 would be necessary to return the cam to its initial position, thus requiring a longer period of time for the braking mechanism to respond to the movement of the lever 17. However, immediately after the valve s has been opened, the pressure fluid admitted above the piston will force the piston c, the arm k and the link 20 downwardly. In consequence, the cam z will be rocked to such a position on the valve stem x that a slight movement of the lever 17 will again permit the valve s to close and the cam will be quickly brought in contact with the stem 7 of the valve 6 irrespective of the position which the lever 17 may have previously occupied. By means of the linkage described the opening and closing of the valves s and 6 may be so controlled that the piston c may at all times be brought to a stop without causing said piston to rebound.

To the end that the brake shoes H and J may be automatically applied in case the supply of pressure fluid for actuating the piston c should fail or become accidentally cut off, a pair of arms 22 are suspended from the cross bar j and are connected at their lower ends by a cross bar 23 which bar forms a support for a weight or a plurality of weights 24. The weights 24 at all times tend to pull the piston c to the lowermost portion of the cylinder b and consequently to apply the brake to the drum G, but since there is a constant supply of pressure fluid beneath the piston c, the force of such weights will be overcome by the pressure fluid beneath the piston c.

In the operation of the device, assuming that the brake is about to be applied to the drum G, the lever 17 may be moved towards the position indicated in Figure 2. Movement of the lever towards this position will cause the cam Z to open the valve s and thus permit pressure fluid from the pipe o through the bushing w into the chamber 9 and through the passage r into the top portion of the cylinder b. Pressure fluid thus acting against the top face of the piston c, together with the weight 24, will overcome the pressure beneath the piston and force the piston downwardly in the cylinder. The downward movement thus obtained will be transmitted to the linkage connecting the cross head e with the brake shoes H and J and force said brake shoes against the drum G.

To release the brake, the lever 17 may be rocked toward the engine Z. Such movement of the lever 17 will rock the cam z to the position shown in Figure 1 and cause said cam to open the valve 6 thereby exhausting a portion of the pressure fluid from the top portion of the cylinder b to the atmosphere as heretofore described.

From the foregoing description it will be obvious that by means of the floating gear comprised of the various linkage connecting the brake shoes H and J with the piston C, the brake shoes will follow the movement of regulating levers 17. In other words, any movement of the regulating lever will result in a proportional movement of the brake shoes, either to apply the brake or, to release it, as the case may be.

By means of the arrangement of parts hereinbefore described the movement of the brake shoes H and J may be readily controlled, and the said brake shoes may be moved into any intermediate position with unusual accuracy. This is due chiefly to the gradual control of the pressure fluid to and from the top end of the cylinder obtained by means of the tapered washers carried by the valves. By means of these tapered washers, or such modification thereof as may be included within the scope of the appended claims, the flow of pressure fluid to the cylinder and the exhaust of pressure fluid therefrom may be so controlled that the piston may be brought smoothly and almost instantly to rest in any intermediate position without any undue jars or rebound.

This construction enables me to obtain a smooth braking action, and the objectionable chattering of the brake shoes generally occurring in similar mechanisms is entirely eliminated.

I claim:

1. In a gravity air brake, the combination with a hoist having a drum, brake shoes forming a brake for said drum, linkage for uniformly applying said brake shoes, of a cylinder, a piston in the cylinder connected to the linkage for controlling the brake, one end of said cylinder being constantly exposed to live pressure fluid tending to release the brake, a pair of valves controlling the admission and exhaust of pressure fluid to and from the other end of the cylinder for applying and releasing the brake, a weight suspended from the piston to augment the pressure fluid employed for applying the brake, and means including a manually operated cam for manipulating the valves.

2. In a gravity air brake, the combination with a hoist having a drum, brake shoes forming a brake for said drum, linkage for uniformly applying the brake, of a cylinder, a piston in the cylinder connected to the linkage for controlling the brake, the lower end of said cylinder being constantly exposed to live pressure fluid tending to release the brake, a valve for admitting pressure fluid into the upper end of the cylinder to counterbalance the pressure fluid in the lower end of the cylinder and to apply the brake, a valve for releasing pressure fluid from the upper end of the cylinder thereby permitting the pressure fluid in the lower end of the cylinder to raise the piston and release the brake, a manually operated cam controlling the valves, and a weight suspended from the piston to augment the pressure fluid in the upper end of the cylinder for applying the brake and for automatically applying the brake upon the release of pressure fluid from both ends of the cylinder.

3. In a gravity air brake, the combination with a hoist having a drum, brake shoes forming a brake for said drum, linkage for uniformly applying said brake shoes, of a cylinder, a piston in the cylinder connected to the linkage for controlling the brake, one end of said cylinder being constantly exposed to live pressure fluid tending to release the brake, a weight suspended from the piston constantly tending to apply the brake, a valve chest, valve bushings in said chest and in communication with one end of the cylinder, valves adapted to seat on the ends of said bushings, means associated with said valves for gradually reducing and increasing the flow of pressure fluid through the ends of the bushings to and from the other end of the cylinder, and a manually operable cam for opening and closing the valves.

4. In a gravity air brake, the combination with a hoist having a drum, brake shoes forming a brake for said drum, linkage for uniformly applying said brake shoes, of a cylinder, a piston in the cylinder connected to the linkage for controlling the brake, one end of said cylinder being constantly exposed to live pressure fluid tending to release the brake, a weight suspended from the piston constantly tending to apply the brake, a valve chest on the cylinder, valve bushings in said chest and in communication with one end of the cylinder, valves adapted to seat on the ends of the bushings, tapered washers carried by the valves and reciprocable in the bushings whereby the flow of pressure fluid through the bushings to and from the other end of the cylinder may be gradually controlled for applying and releasing the brake, and a manually operable cam for actuating the valves.

5. In a gravity air brake, the combination with a hoist having a drum, brake shoes forming a brake for said drum, linkage for uniformly applying said brake shoes, of a cylinder, a piston in the cylinder connected to the linkage for controlling the brake, one end of said cylinder being constantly exposed to live pressure fluid tending to release the brake, a weight suspended from the piston constantly tending to apply the brake, a valve chest on the cylinder, a pair of valve bushings in said chest and in constant communication with one end of the cylinder, valves adapted to seat on corresponding ends of the bushings, and tapered washers reciprocable with the valves and extending into the bushings, the tapered washer on one valve being adapted to effect a gradual admission of pressure fluid to the other end of the cylinder for applying the brake and the other tapered washer being adapted to effect a gradual release of pressure fluid from the second said end of the cylinder for releasing the brake.

In testimony whereof I have signed this specification.

HARRY V. HAIGHT.